United States Patent
Zanchi et al.

(10) Patent No.: US 12,081,126 B2
(45) Date of Patent: Sep. 3, 2024

(54) MIXED-MODE POWER CONVERTER CONTROL

(71) Applicant: Murata Manufacturing Co., Ltd., Kyoto (JP)

(72) Inventors: Brian Zanchi, Dracut, MA (US); Tim Wen Hui Yu, San Diego, CA (US); Gregory Szczeszynski, Hollis, TX (US)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 18/333,403

(22) Filed: Jun. 12, 2023

(65) Prior Publication Data

US 2023/0412078 A1 Dec. 21, 2023

Related U.S. Application Data

(63) Continuation of application No. 17/096,820, filed on Nov. 12, 2020, now Pat. No. 11,689,101.

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05); *H02M 1/0009* (2021.05)

(58) Field of Classification Search
CPC .. H02M 3/158; H02M 3/1582; H02M 3/1586; H02M 3/157; H02M 3/156; H02M 3/155
See application file for complete search history.

(56) References Cited

U.S. PATENT DOCUMENTS

| 5,903,449 A | 5/1999 | Garrigan et al. |
| 7,034,508 B1 | 4/2006 | Sasaki |

(Continued)

FOREIGN PATENT DOCUMENTS

| EP | 3657182 | 5/2020 |

OTHER PUBLICATIONS

Kazimierczuk, Marian K., "Pulse-Width Modulated DC-DC Power Converters, 2nd Ed." 2016 John Wiley & Sons, 68 pgs.

(Continued)

*Primary Examiner* — Nguyen Tran
(74) *Attorney, Agent, or Firm* — JAQUEZ LAND GREENHAUS & McFARLAND LLP; John Land, Esq.

(57) ABSTRACT

Circuits and methods for adding a Current Mode signal into a Voltage Mode controller for fixed-frequency DC-to-DC power converters. A current-controlled voltage source (CCVS) generates a voltage proportional to the power converter output current, which voltage is combined with a comparison signal generated by comparing a target output voltage to the actual output voltage. The modified comparison signal generates a pulse-width modulation control signal that regulates the power converter output as a function of output voltage and some portion of output current. With the addition of an inductor current signal into the controller Voltage Mode feedback loop, the double pole predominant in constant conduction mode (CCM) mode can be smoothed over to improve stability, while discontinuous conduction mode (DCM) loop response is largely unchanged with or without the added Current Mode signal. Embodiments enable simplified compensation while covering a wider operating range.

18 Claims, 10 Drawing Sheets

(56) References Cited

U.S. PATENT DOCUMENTS

| | | |
|---|---|---|
| 8,669,743 B2 | 3/2014 | Rozman |
| 9,160,165 B2 | 10/2015 | Cortigiani |
| 9,190,906 B2 | 11/2015 | Henzier |
| 9,389,627 B2 | 7/2016 | Kurokawa |
| 9,648,572 B2 | 5/2017 | Hanke |
| 9,772,639 B2 | 9/2017 | Farber |
| 9,870,012 B2 | 1/2018 | Raychowdhury |
| 10,263,518 B2 | 4/2019 | Bodano |
| 10,716,184 B1 | 7/2020 | Pu |
| 11,594,965 B2 | 2/2023 | Zanchi et al. |
| 11,689,101 B2 | 6/2023 | Zanchi et al. |
| 2004/0052095 A1 | 3/2004 | Muegge et al. |
| 2005/0212498 A1 | 9/2005 | Kubota |
| 2008/0007235 A1 | 1/2008 | Hane |
| 2008/0024100 A1 | 1/2008 | Huang |
| 2011/0175581 A1* | 7/2011 | Hane ............... H02M 3/156 323/271 |
| 2012/0182003 A1 | 7/2012 | Flaibani |
| 2019/0271998 A1 | 9/2019 | Sisson et al. |
| 2021/0050718 A1 | 2/2021 | Djelassi-Tscheck |
| 2022/0149732 A1 | 5/2022 | Zanchi et al. |
| 2022/0190719 A1 | 6/2022 | Zanchi et al. |
| 2023/0253882 A1 | 8/2023 | Zanchi et al. |

OTHER PUBLICATIONS

Lynch, Brian T., "Under the Hood of a DC/DC Boost Converter", TI Power Supply Design Seminar, vol. 2009, 2008, 26 pgs.

Sheehan, Robert, "Understanding and Applying Current-Mode Control Theory", Principal Applications Engineer National Semiconductor Corporation, Santa Clara, CA, PES07, Oct. 31, 2007, 30 pgs.

Sipex, "Voltage Mode Control: The Modulator in Continuous Current Mode (CCM) of Operation", Application Note ANP 15, Dec. 18, 2006, 10 pgs.

Zanchi, et al., "Power Conveter Control", patent application filed in the USPTO dated Dec. 14, 2020, U.S. Appl. No. 17/121,426, 45 pgs.

PSEMI Corporation, Preliminary Amendment filed in the USPTO dated Feb. 23, 2021 for U.S. Appl. No. 17/121,426, 7 pgs.

Park, Hye Lyun, International Search Report and Written Opinion received from KIPO dated Feb. 28, 2022 for appln. No. PCT/US2021/058455, 8 pgs.

Ioannidis, et al., "A mixed-mode PWM controller", International Journal of Electronics, vol. 97, No. 12, Dec. 2010, pp. 1423-1438.

Gblende, Jeffrey A., Office Action received from the USPTO dated Jul. 11, 2022 for U.S. Appl. No. 17/121,426, 17 pgs.

Gblende, Jeffrey A., Notice of Allowance received from the USPTO dated Oct. 27, 2022 for U.S. Appl. No. 17/121,426, 8 pgs.

Tran, Nguyen, Office Action received from the USPTO dated Mar. 9, 2022 for U.S. Appl. No. 17/096,820, 21 pgs.

Tran, Nguyen, Final Office Action received from the USPTO dated Oct. 6, 2022 for U.S. Appl. No. 17/096,820, 24 pgs.

Gblende, Jeffrey A., Office Action received from the USPTO dated Jul. 20, 2023 for U.S. Appl. No. 18/172,732, 20 pgs.

Gblende, Jeffrey A., Notice of Allowance received from the USPTO dated Nov. 8, 2024 for U.S. Appl. No. 18/172,732, 9 pgs.

* cited by examiner

MIXED-MODE POWER CONVERTER CONTROL

CROSS-REFERENCE TO RELATED APPLICATIONS

The present continuation application claims priority to the following patent application, assigned to the assignee of the present invention, the contents of which are incorporated by reference: U.S. patent application Ser. No. 17/096,820, filed Nov. 12, 2020, entitled "Mixed-Mode Power Converter Control".

BACKGROUND

(1) Technical Field

This invention relates to electronic circuits, and more particularly to control systems for power converter circuits.

(2) Background

Many electronic products, particularly mobile computing and/or communication products and components (e.g., notebook computers, ultra-book computers, tablet devices, LCD and LED displays) require multiple voltage levels. For example, a cellular telephone may utilize LCD displays backlit by LEDs, both of which may require different voltage levels than the radio frequency transceivers in the cellphone, and all of those voltage levels may differ from the voltage directly supplied by the battery of the cellphone.

In modern electronic systems requiring unique voltage rails, there has been a trend towards using a single-voltage, intermediate-bus architecture rather than a centralized, multi-voltage source. Localized "point-of-load" DC-to-DC power converters may then be optimized for specific loads. DC-to-DC power converters generate a lower or higher voltage from a common power source, such as a battery. Power converters which generate a lower output voltage (e.g., $V_{OUT}$) Level from a Higher Input Voltage (e.g., $V_{IN}$) Power Source are Commonly Known as Step-down or buck converters, so-called because $V_{OUT} < V_{IN}$, and hence the converter is "bucking" the input voltage. Power converters which generate a higher output voltage level from a lower input voltage power source are commonly known as step-up or boost converters, because $V_{OUT} > V_{IN}$. An AC-DC power converter can be built up from a DC-DC power converter by, for example, first rectifying an AC input to a DC voltage and then applying the DC voltage to a DC-DC power converter.

FIG. 1 is a block diagram showing a prior art DC-to-DC power converter 100. In the illustrated example, the power converter 100 includes a DC-to-DC converter circuit 102 and a controller 104. The DC-to-DC converter circuit 102 is configured to receive a DC input voltage $V_{IN}$ from a voltage source 106 (e.g., a battery) across terminals V1+, V1−, and transform the input voltage $V_{IN}$ into a DC output voltage $V_{OUT}$ across terminals V2+, V2−. The output voltage $V_{OUT}$ is shown coupled across a load $R_{LOAD}$.

The controller 104 receives a set of input signals and produces a set of output signals. Some of these input signals arrive along a signal path 110 connected to the DC-to-DC converter circuit 102. These input signals carry information that is indicative of the operational state of the converter circuit 102. The controller 104 typically also receives at least a clock signal CLK and one or more external input/output (I/O) signals that may be analog, digital, or a combination of both. Based upon the received input signals, the controller 104 produces a set of control signals back to the converter circuit 102 on the signal path 110 that control the internal components of the DC-to-DC converter circuit 102 (e.g., internal switches, such as low voltage FETs, especially MOSFETs) to cause the converter circuit 102 to boost or buck $V_{IN}$ to $V_{OUT}$. In some embodiments, an auxiliary circuit (not shown) may provide various signals to the controller 104 (and optionally directly to the DC-to-DC converter circuit 102), such as the clock signal CLK, the I/O signals, as well as various voltages, such as one or more reference voltages $V_{REF}$ and/or bias voltages $V_{BIAS}$.

Although shown as separate blocks, the DC-to-DC converter circuit 102 and the controller 104 may be integrated together, in whole or in part, on one integrated circuit (IC). In addition, the DC-to-DC converter circuit 102 and/or the controller 104 may include one or more external components, such as inductors or capacitors, as needed for a particular application.

One type of DC-to-DC power converter is based on a fixed-frequency switched inductor-capacitor circuit controlled by a pulse-width modulation (PWM) closed-loop controller. For example, FIG. 2 is a schematic diagram of one prior art switched inductor-capacitor DC-to-DC power converter circuit 200. In the illustrated example, two switches M1, M2 are series-coupled between an input voltage $V_{IN}$ and circuit ground. An energy-storage inductor L is coupled to a node N1 between the switches M1, M2 and to a node N2, which presents an output voltage $V_{OUT}$. A filter capacitor C is coupled between the node N2 and circuit ground. A resistor $R_{LOAD}$ represents a DC load between node N2 and circuit ground. The L-C-$R_{LOAD}$ subcircuit functions like a second-order low-pass filter to smooth voltage variations present at node N1.

The switches M1, M2 are depicted in FIG. 2 as field-effect transistors, such as MOSFETs. However, other power switches such as bipolar junction transistors (BJTs), isolated gate bipolar transistors (IGBTs), or MOS-controlled thyristors (MCTs) may also be used. In some embodiments, switch M2 may be implemented as one or more series-coupled diodes.

The function of the inductor L and the filter capacitor C is energy transfer and storage. A PWM duty cycle controller 202 coupled to control inputs of the switches M1, M2 (e.g., the gates of MOSFETs) alternately enables (turns "ON") and disables (turns "OFF") the switches M1, M2 by means of a PWM-CTRL signal (and its inverse, /PWM_CTRL through an inverter 204), so that M1 and M2 controls the energy flow from the source to the load. The PWM duty cycle controller 202 receives $V_{OUT}$ as a feedback voltage (e.g., from node N2) and generally receives a fixed-frequency clock signal CLK or internally generates such a clock signal. The feedback voltage enables the PWM duty cycle controller 202 to vary the duty cycle of the PWM-CTRL signal to offset changes in the load resistance $R_{LOAD}$ and/or the input voltage $V_{IN}$, or changes in the load current $I_{OUT}$, thereby regulating $V_{OUT}$. The PWM duty cycle controller 202 may be part of the controller 104 of FIG. 1 or may be a stand-alone circuit. Note that additional components, such as level shifters and/or driver circuits, may be needed between the PWM duty cycle controller 202 and the control inputs of the switches M1, M2 in some embodiments.

It would be beneficial to improve the functionality of a PWM duty cycle controller for a DC-to-DC power converter that provides for stable operation and simplified compensation over a wide operating range.

SUMMARY

The invention encompasses circuits and methods for adding a Current Mode signal into a Voltage Mode controller for fixed-frequency DC-to-DC power converters. A current-controlled voltage source (CCVS) generates a voltage proportional to the power converter output current, which voltage is combined with a comparison signal generated by comparing a target output voltage to the actual output voltage. The modified comparison signal generates a pulse-width modulation control signal that regulates the power converter output as a function of output voltage and some portion of output current.

With the addition of an inductor current signal into the controller Voltage Mode feedback loop, the double pole predominant in constant conduction mode (CCM) mode can be smoothed over to improve stability, while discontinuous conduction mode (DCM) loop response is largely unchanged with or without the added Current Mode signal. Embodiments enable simplified compensation while covering a wider operating range.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The invention encompasses circuits and methods for adding a Current Mode signal into a Voltage Mode controller for fixed-frequency DC-to-DC power converters. With the addition of an inductor current signal into the controller Voltage Mode feedback loop, the double pole predominant in constant conduction mode (CCM) mode can be smoothed over to improve stability, while discontinuous conduction mode (DCM) loop response is largely unchanged with or without the added Current Mode signal. Embodiments enable simplified compensation while covering a wider operating range.

General Embodiment of a PWM Controller

Figure 1:
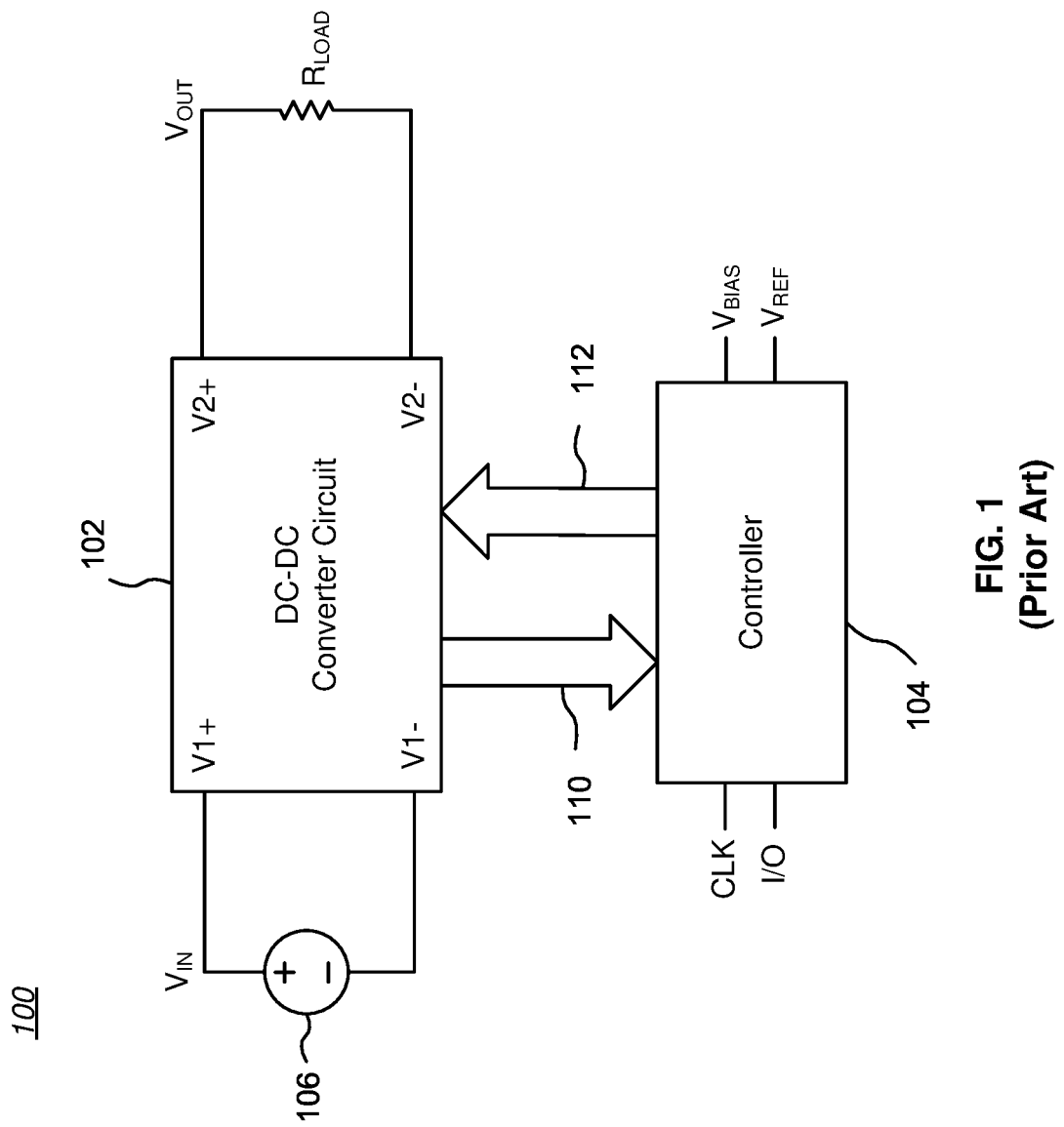
FIG. 1 is a block diagram showing a prior art DC-to-DC power converter.
Figure 2:
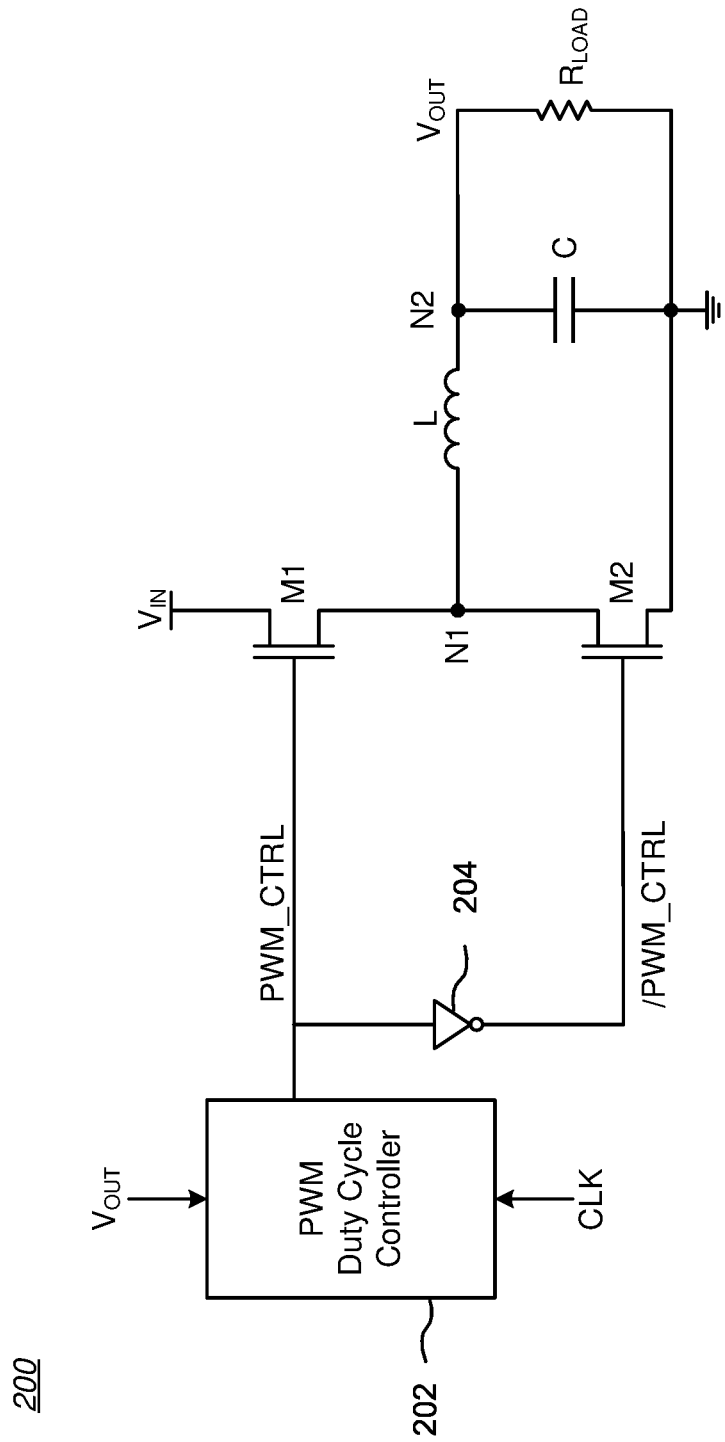
FIG. 2 is a schematic diagram of one prior art DC-to-DC power converter circuit.
Figure 3:
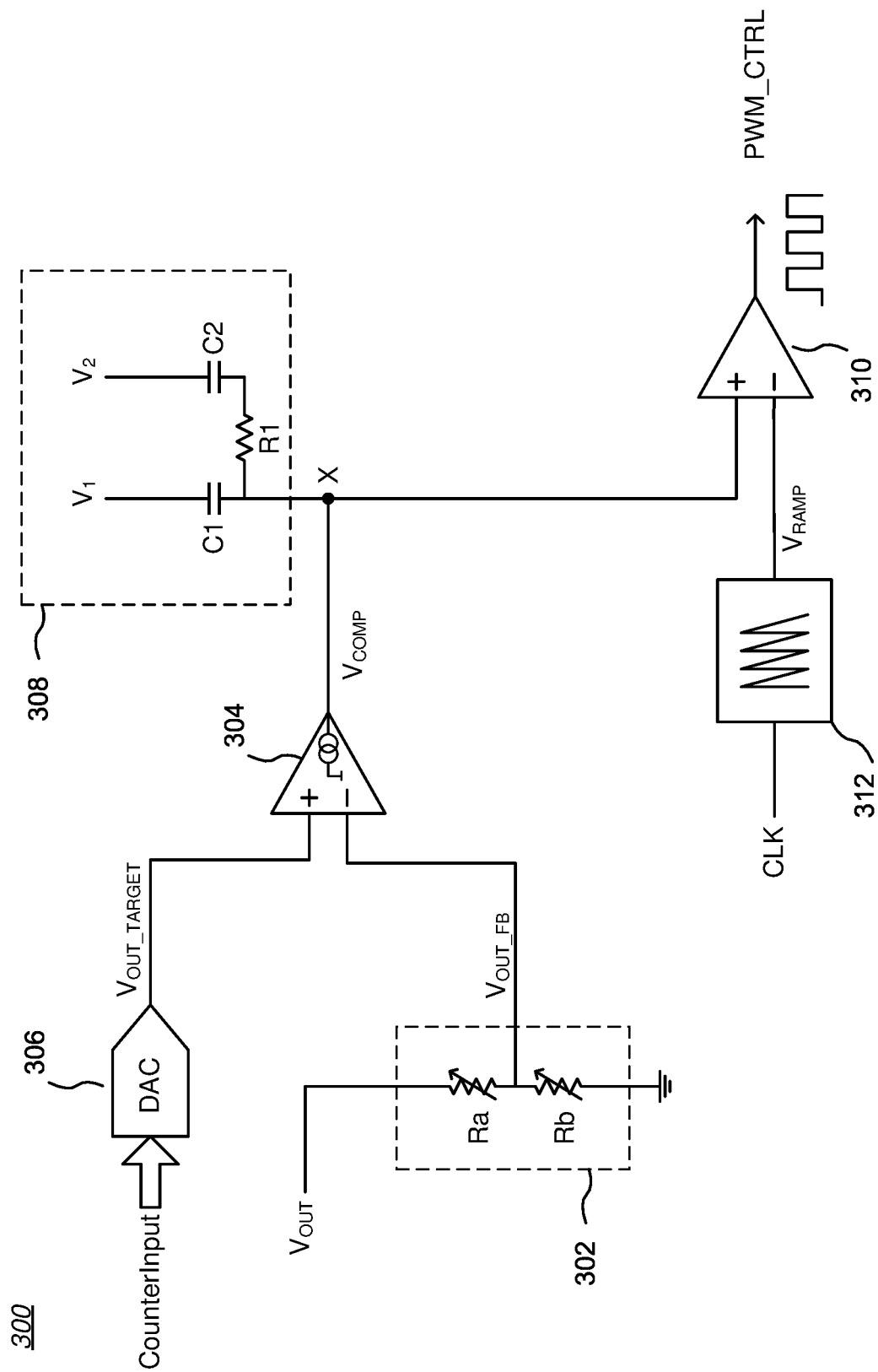
FIG. 3 is a schematic diagram of a PWM duty cycle controller which may be used in the circuit of FIG. 2.

FIG. 3 is a schematic diagram of a PWM duty cycle controller 300 which may be used in the circuit of FIG. 2. The output voltage $V_{OUT}$ is applied, either directly or as translated to a lower reference point by a scaling circuit 302, to a first input of an error amplifier 304 as a feedback voltage, $V_{OUT\_FB}$. In the illustrated example, the scaling circuit 302 is a resistive divider comprising two resistors Ra, Rb coupled in series between $V_{OUT}$ and circuit ground, and provides a scaled output, $V_{OUT\_FB}$ to the error amplifier 304. The resistors Ra, Rb are shown as variable or settable, but may be fixed in value. Scaling of $V_{OUT}$ to $V_{OUT\_FB}$ may be accomplished by other known circuits, and other types of comparison circuits may be used in place of the error amplifier 304.

A second input of the error amplifier 304 is shown coupled to a digital-to-analog converter (DAC) 306 that sets a target voltage, $V_{OUT\_TARGET}$, for the output of a connected DC-to-DC converter circuit 102. The DAC 306 generally is coupled to a counter (not shown), which alters $V_{OUT\_TARGET}$ up or down in value in response to $V_{OUT}$ in order to change the duty cycle of a connected DC-to-DC converter circuit 102. As $V_{OUT}$ changes in response to the modified duty cycle, the count input to the DAC 306 will increment or decrement, thereby causing a corresponding change in $V_{OUT\_TARGET}$. As is known in the art, other circuits may be used in place of the DAC 306 to set the target voltage $V_{OUT\_TARGET}$ for the DC-DC converter output.

The error amplifier 304 integrates the error between $V_{OUT\_TARGET}$ and $V_{OUT\_FB}$, outputting a comparison signal $V_{COMP}$ at node X. The output of the error amplifier 304 may be coupled to a compensation circuit 308 configured to stabilize the closed-loop response of the PWM duty cycle controller 300. In the illustrated example, the compensation circuit 308 includes a first capacitor C1 coupled between a control voltage $V_1$ and node X, and a series-coupled second capacitor C2 and resistor R1 coupled between a control voltage $V_2$ and node X. In general, $V_1$ and $V_2$ are dependent on the controller topology and can be nodes such as $V_{DD}$, $V_{OUT}$, and/or circuit ground, for example. Other compensation circuits 308 may be used in some embodiments.

The $V_{COMP}$ signal is coupled to a first input of a comparator 310. A second input of the comparator 310 is coupled to a voltage ramp generator 312, which may have $V_{IN}$ and $V_{OUT}$ feedforward adjustments, as is known in the art. While a ramp generator is shown by way of example, it should be understood that other types of periodic waveforms (e.g., sawtooth, triangular, sinusoidal, etc.) may be used.

The voltage ramp generator 312 is coupled to a fixed-frequency clock signal CLK and outputs a ramped voltage signal, $V_{RAMP}$, to the comparator 310. The comparator 310 compares $V_{RAMP}$ to the integrated error signal, $V_{COMP}$, and generates a pulse-width modulated PWM_CTRL control signal having a duty cycle that is a function of the comparison. The PWM_CTRL control signal is coupled to the DC-to-DC power converter circuit 200 of FIG. 2 to switch the ON-OFF state of the switches M1, M2.

As one example of the operational characteristics of a DC-to-DC power converter circuit 200 controlled by a PWM duty cycle controller 300, in practice, the DC input voltage $V_{IN}$ often varies over a specified range while the output voltage $V_{OUT}$ is designed to be held at a fixed value. If $V_{IN}$ increases for a specified load $R_{LOAD}$, the duty cycle of the PWM_CTRL control signal is reduced to keep $V_{OUT}$ essentially constant, and, conversely, if $V_{IN}$ is reduced, the duty cycle of the PWM_CTRL control signal is increased. Similarly, if the load current $I_{OUT}$ decreases, the duty cycle of the PWM_CTRL control signal is reduced, and if the load current $I_{OUT}$ increases, the duty cycle of the PWM_CTRL control signal is increased.

DC-to-DC power converter circuits like the example shown in FIG. 2 can operate in a constant conduction mode (CCM) or in a discontinuous conduction mode (DCM), generally depending on value of the inductor current. In CCM, the current flows through the inductor L of FIG. 2 for the entire PWM cycle, whereas in DCM, the current flows through the inductor L for only a part of the cycle. More specifically, in DCM, the inductor the current falls to zero, remains at zero for some time interval, and then starts to increase. DCM is generally selected to prevent negative currents if the load drops to or close to zero.

Traditionally, fixed-frequency DC-DC power converters are controlled with either a Current Mode controller or a Voltage Mode controller (an example of which is shown in FIG. 3). A Current Mode controller essentially monitors the current through the inductor L (e.g., from node N1 to node N2), while a Voltage Mode controller essentially monitors the output voltage (e.g., at node N2). As is known in the art, each controller has their advantages and disadvantages.

A Current Mode controller has great supply rejection because the closed-loop rejects input voltage variations by tightly controlling the output current, and also has a simpler a compensation circuit. However, a Current Mode controller introduces another variable (current) into the control system which adds uncertainty to the circuit design, and can make the design of the comparator and some secondary control (e.g., clamping circuitry) more complicated. A Voltage Mode controller has better load step response than a Current Mode controller because the closed-loop rejects output load variations by tightly controlling the input/output voltage ratio. A Voltage Mode controller generally also can operate at higher frequencies than a Current Mode controller, leading to faster response times to voltage and/or load variations.

Voltage Mode is generally preferred for high-frequency switching, but compensating for both CCM and DCM is challenging. In DCM operation, the loop dynamics change and look more like current-mode, which requires different optimal compensation. Furthermore, Voltage Mode has a "double-pole" created by the energy-storage inductor L and filter capacitor C. This double-pole makes it very hard to have cross-over (0 dB Gain) in the frequency response next to the double-pole, and therefore restricts the choice of inductor and output capacitance that can be used in order to prevent the double-pole from being close to a desired the cross-over frequency.

Figure 4A:
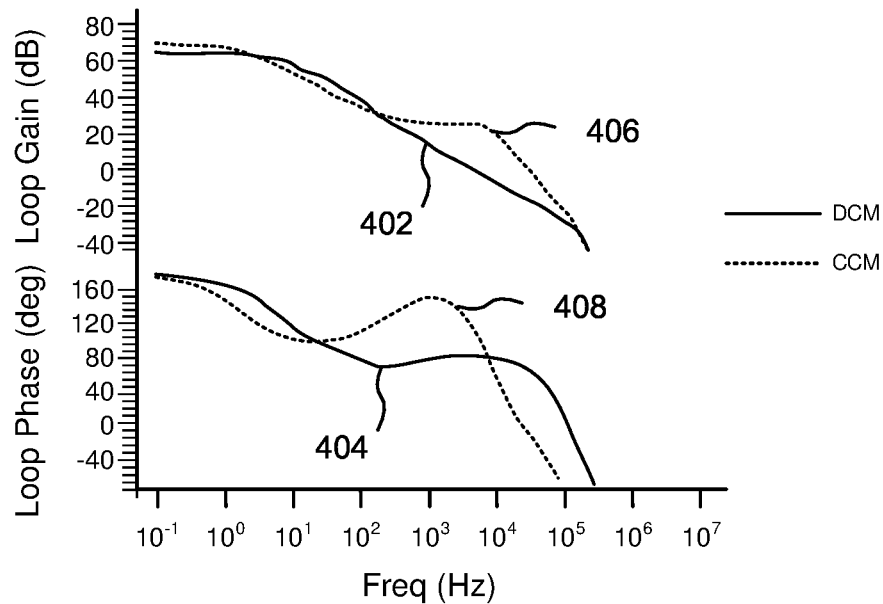
FIG. 4A is a graph of loop gain and phase versus frequency for a modeled embodiment of a DC-to-DC power converter having a Voltage Mode controller optimized for compensation in DCM.
Figure 4B:
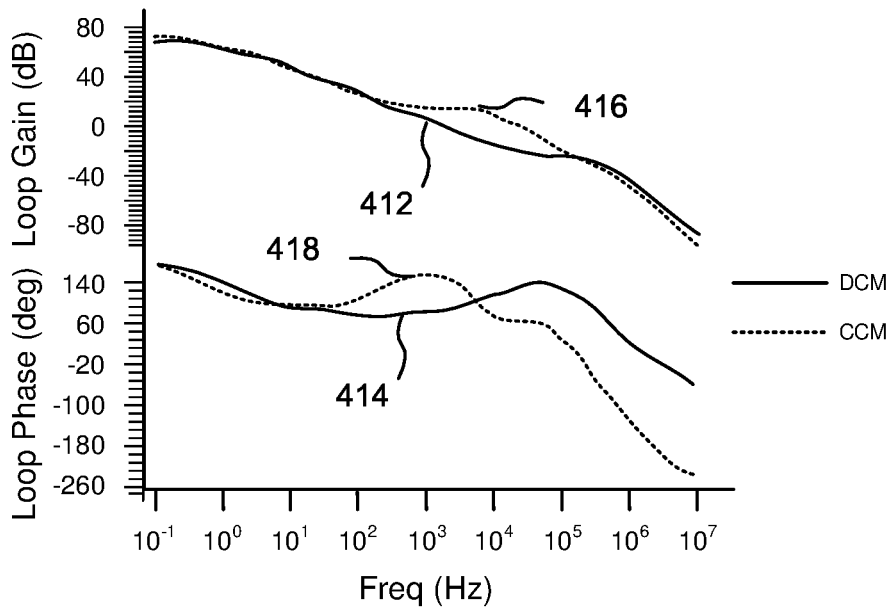
FIG. 4B is a graph of loop gain and phase versus frequency for a modeled embodiment of a DC-to-DC power converter having a Voltage Mode controller optimized for compensation in CCM.

For example, FIG. 4A is a graph 400 of loop gain and phase versus frequency for a modeled embodiment of a DC-to-DC power converter having a Voltage Mode controller optimized for compensation in DCM, while FIG. 4B is a graph 410 of loop gain and phase versus frequency for a modeled embodiment of a DC-to-DC power converter having a Voltage Mode controller optimized for compensation in CCM. In essence, compensating for one mode of operation can make for an unstable loop in the other mode of operation. Thus, in FIG. 4A, graph lines 402 and 404 show that gain and phase, respectively, for DCM are stable when compensation is optimized for that mode, while graph lines 406 and 408 show that gain and phase, respectively, for CCM are unstable (noting in particular the prominent peaks in graph lines 406 and 408). Similarly, in FIG. 4B, graph lines 412 and 414 show that gain and phase, respectively, for CCM are stable when compensation is optimized for that mode, while graph lines 416 and 418 show that gain and phase, respectively, for CCM are unstable (noting in particular the prominent peaks in graph lines 416 and 418 and the lower crossover frequency Fc for phase graph line 418).

Accordingly, the inventors have recognized that it would be useful to utilize the advantages of a Voltage Mode controller for a high-frequency DC-to-DC power converter circuit while eliminating or mitigating the disadvantages of such a controller.

First Embodiment

Figure 5:
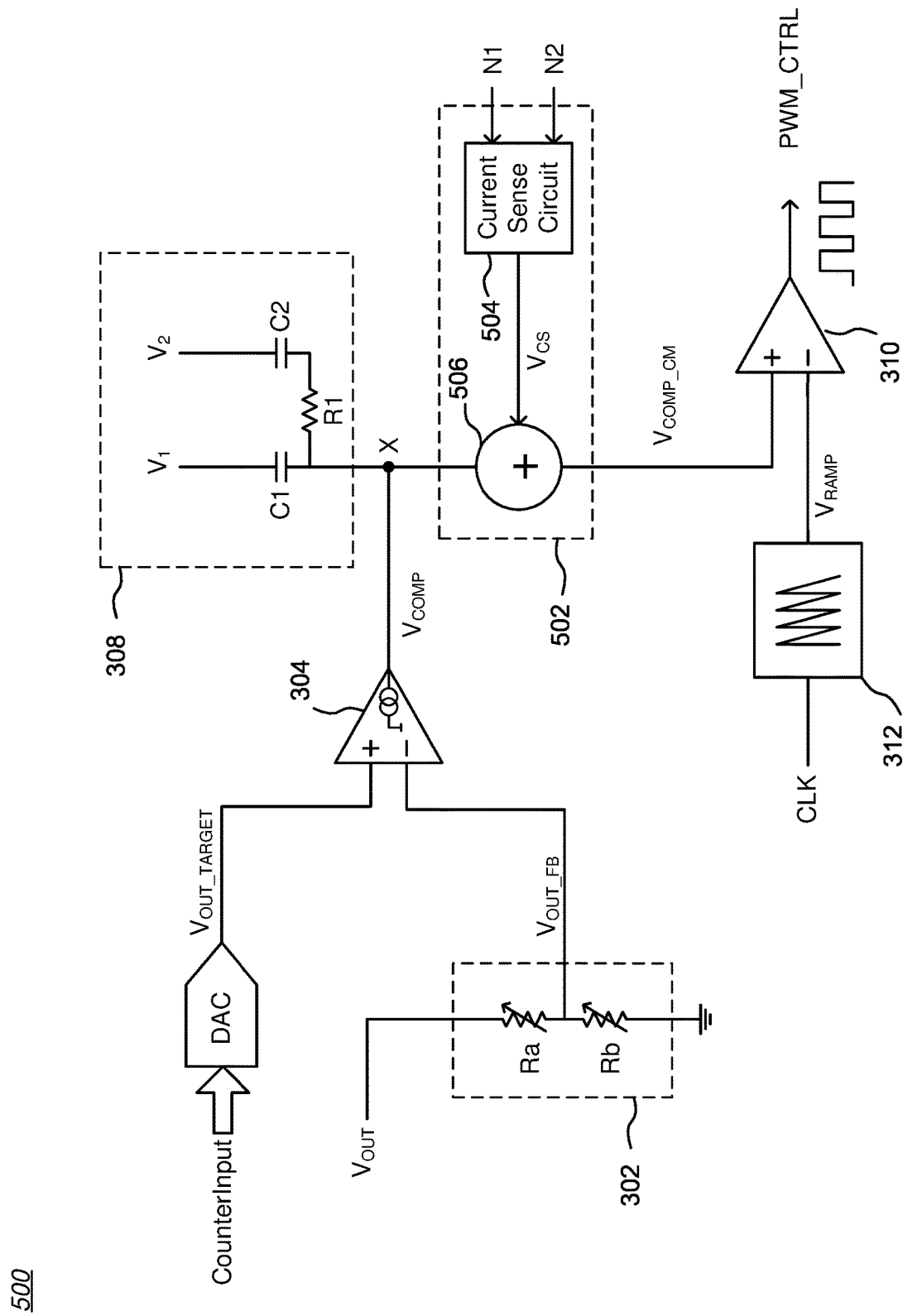
FIG. 5 is a schematic diagram of a first embodiment of an improved PWM duty cycle controller which may be used in the circuit of FIG. 2.

FIG. 5 is a schematic diagram of a first embodiment of an improved PWM duty cycle controller 500 which may be used in the circuit of FIG. 2. Similar in many aspects to the PWM duty cycle controller 300 of FIG. 3, the improved PWM duty cycle controller 500 introduces a modifier circuit comprising current-controlled voltage source (CCVS) 502 between the error amplifier 304 and the comparator 310. As is known in the art, a CCVS outputs a voltage proportional to an applied current. In the illustrated example, the CCVS 502 includes a current sense circuit 504 that outputs a voltage $V_{CS}$ that is representative of the current flowing through the inductor L of FIG. 2. For example, the current sense circuit 504 may be coupled across nodes N1 and N2 of FIG. 2 and output a value for $V_{CS}$ that is proportional to the inductor L current or to a current through a replica circuit or component (e.g., a small inductor in parallel with the inductor L). However, the current may be measured at other locations within the circuit of FIG. 2. In some embodiments, the inductor L current may be a calculated (synthesized) representation based on known characteristics of the circuit of FIG. 2. The output of the current sense circuit 504 is coupled to an adder 506 that combines $V_{CS}$ voltage with the $V_{COMP}$ voltage from the error amplifier 304. As should be clear, other types of current-controlled voltage source circuits may be used in embodiments of the invention to provide the function of combining $V_{COMP}$ with a voltage $V_{CS}$ representative of the inductor L current.

The CCVS 502 is preferably configured with an adjustable gain, thus allowing a selectable fraction of the representative inductor L current to be converted to a voltage that adds to or subtracts from the $V_{COMP}$ signal to generate a modified signal $V_{comp\_cm}$ that is applied to the comparator 310. When the gain is set to zero, the PWM duty cycle controller 500 behaves like a standard Voltage Mode controller. When the gain is set to non-zero values, the PWM duty cycle controller 500 behaves like a hybrid of a Voltage Mode controller and a Current Mode controller, combining the advantages noted above of both modes.

Figure 6:
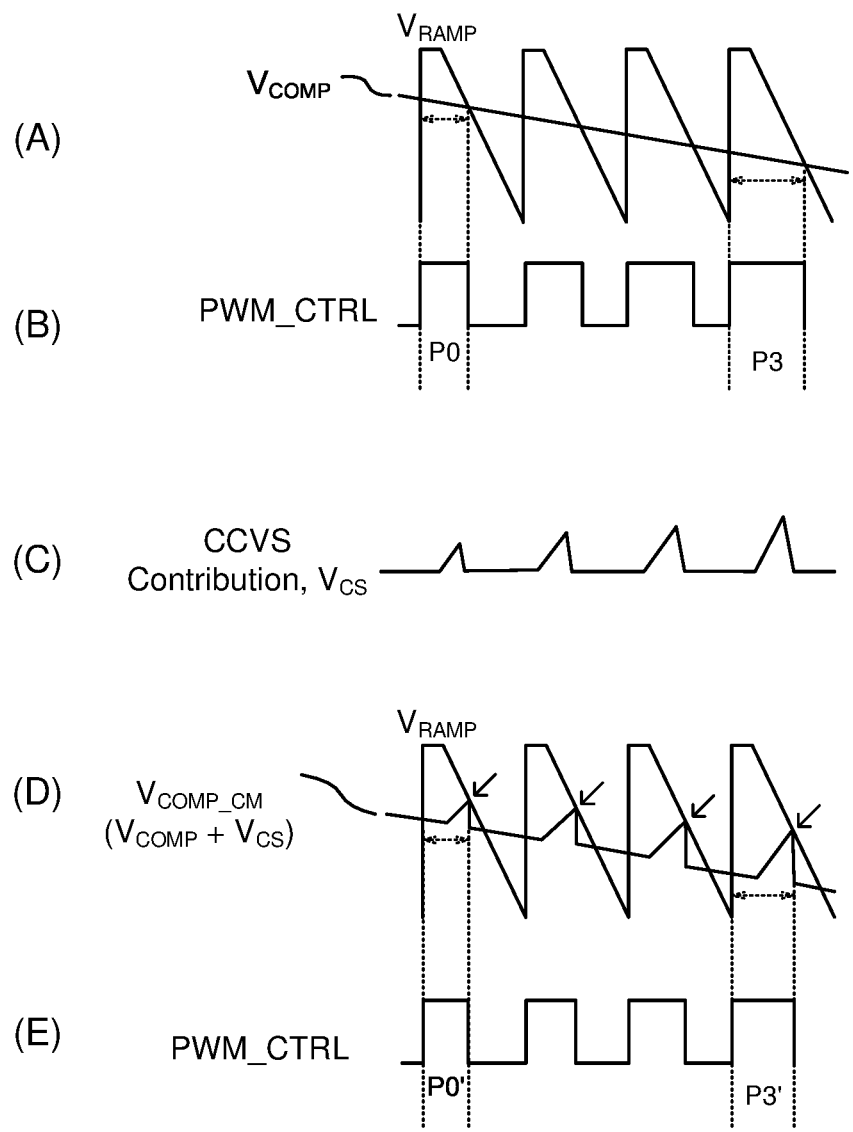
FIG. 6 is a set of graphs (A)-(E) of various signals versus time.

FIG. 6 is a set of graphs (A)-(E) of various signals versus time. Graph (A) shows the two inputs to the comparator 310 of FIG. 3, a conventional Voltage Mode controller. The comparator 310 of a conventional Voltage Mode controller compares the error signal $V_{COMP}$ to the ramped voltage signal $V_{RAMP}$ from the voltage ramp generator 312 to generate the PWM_CTRL control signal, shown in Graph (B). In essence, the comparator 310 begins a pulse when $V_{COMP}$ crosses the leading edge of a $V_{RAMP}$ cycle and ends the pulse when $V_{COMP}$ crosses the trailing edge of the $V_{RAMP}$ cycle. In the illustrated example, the $V_{COMP}$ error signal slopes downward, which indicates that $V_{OUT\_FB}$ (proportional to $V_{OUT}$) is less then $V_{OUT\_TARGET}$, and hence the duty cycle of the PWM_CTRL control signal is increased to force $V_{OUT}$ higher—compare the narrow width of PWM pulse P0 with the wider width of PWM pulse P3. In this example, $V_{RAMP}$ is clamped to provide for a minimum duration of the PWM_CTRL control signal. Note that the improved PWM duty cycle controller 500 of FIG. 5 will generate a similar PWM_CTRL control signal when the gain of the CCVS 502 is zero.

Graph (C) shows the voltage output of the CCVS 502, proportional to the current through the inductor L for the first half of each PWM cycle. In this example, the voltage $V_{CS}$ generated by the CCVS 502 is increasing over time, indicating that the inductor current is excessive and thus that the average current should be reduced by reducing $V_{COMP}$. (Note that the frequency of the PWM_CTRL control signal control signal is typically in the megahertz range, while the frequencies of the $V_{COMP}$ and $V_{CS}$ loop control signals are typically in the kilohertz range, so the time scales in FIG. 6 are not all comparable).

Graph (D) shows the combination of the voltage output of the CCVS 502 from Graph (C) and the $V_{COMP}$ signal from Graph (A), forming a modified signal $V_{comp\_cm}$. The comparator 310 of the improved Voltage Mode controller 502 of FIG. 5 compares the modified signal $V_{comp\_cm}$ to the ramped voltage signal $V_{RAMP}$ from the voltage ramp generator 312 to generate the PWM_CTRL control signal, shown in Graph (E). In essence, the comparator 310 begins a pulse when $V_{comp\_cm}$ crosses the leading edge of a $V_{RAMP}$ cycle and ends the pulse when $V_{comp\_cm}$ crosses the trailing edge of the $V_{RAMP}$ cycle earlier in the cycle (see arrows) compared to Graph (A). In the illustrated example, the $V_{comp\_cm}$ error signal slopes downward but has upward inflections due to the voltage contribution from the CCVS 502, and hence the duty cycle of the PWM_CTRL control signal is decreased somewhat compared to Graph (B). As a result, $V_{OUT}$ is forced to increase but not as quickly—compare the narrow width of PWM pulse P0' with the wider width of PWM pulse P3', and then compare the narrower width of PWM pulse P3' to the wider width of PWM pulse P3 from Graph (B).

As should be clear, the improved PWM duty cycle controller 500 can be operated as a Voltage Mode controller by setting the gain of the CCVS 502 to zero, and like a hybrid of a Voltage Mode controller and a Current Mode controller when the gain of the CCVS 502 is non-zero. By adding the voltage contribution $V_{CS}$ from the CCVS 502—indicative of the current through the inductor L—to the $V_{COMP}$ error signal, the benefits of integrating feed-forward into the Voltage Mode $V_{RAMP}$ comparison can be combined with the simpler dynamic of sensing the inductor current. Thus, embodiments of the present invention preserve the general benefits of a Voltage Mode controller, including better load step response than a pure Current Mode controller and operation at higher frequencies than a Current Mode controller (leading to faster response times to voltage and/or load variations), while eliminating or mitigating the disadvantages of a pure Voltage Mode controller with respect to stable operation in both constant conduction mode and discontinuous conduction mode.

Figure 7:
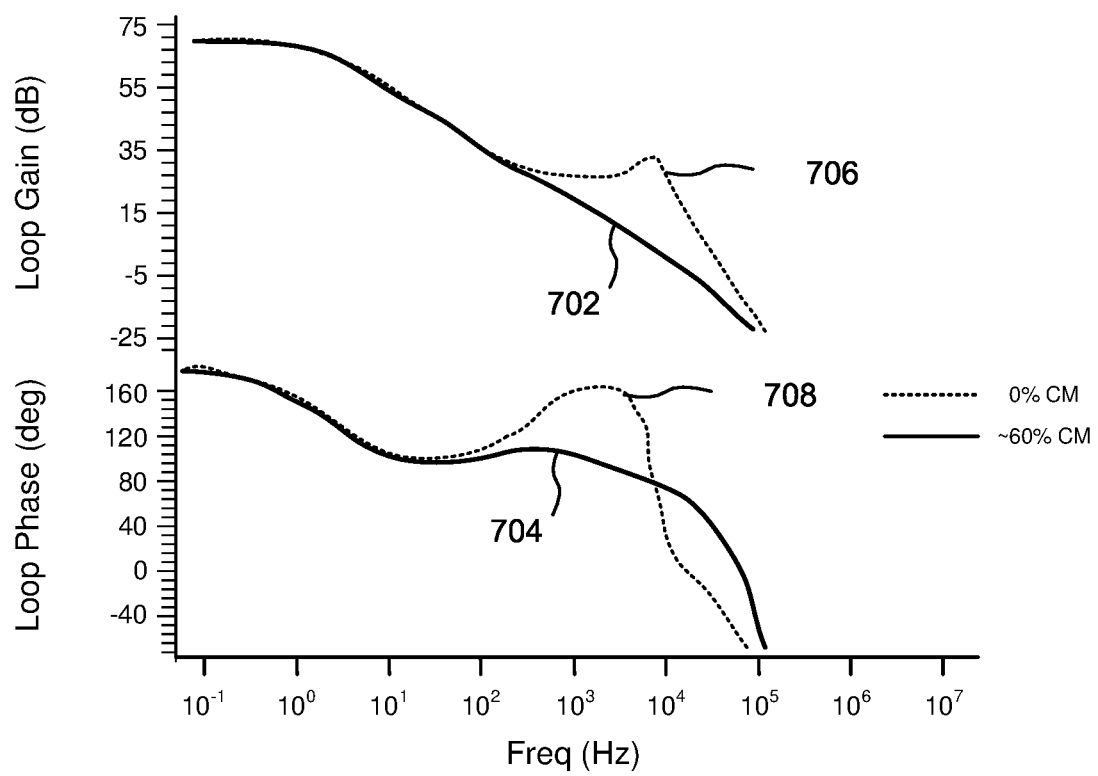
FIG. 7 is a graph of loop gain and phase versus frequency for a modeled embodiment of a DC-to-DC power converter having an improved PWM duty cycle controller in accordance with the present invention.

Notably, with the addition of a voltage signal based on the inductor current into a PWM controller Voltage Mode feedback loop, the double pole predominant in constant conduction mode (CCM) mode can be smoothed over to improve stability, while discontinuous conduction mode (DCM) loop response is largely unchanged with or without the added Current Mode signal (there may be some small reduction of the crossover frequency Fc as more Current Mode signal is added). For example, FIG. 7 is a graph 700 of loop gain and phase versus frequency for a modeled embodiment of a DC-to-DC power converter having an improved PWM duty cycle controller 500 in accordance with the present invention. Graph lines 702 and 704 show gain and phase, respectively, with about 60% Current Mode added (i.e., the CCVS 502 adds a voltage $V_{CS}$ to $V_{COMP}$ set to be proportional to about 60% of the current through the inductor L). Graph lines 706 and 708 show gain and phase, respectively, with no Current Mode added (i.e., the CCVS 502 is set to zero gain). Note in particular that the prominent peaks in graph lines 706 and 708 are essentially eliminated in graph lines 702 and 704. The percentage of Current Mode to add is a circuit design choice for particular embodiments of the improved PWM duty cycle controller 500.

While the example circuit shown in FIG. 5 places the CCVS 502 on the "plus" side of the comparator 310 so as to sum the voltage $V_{CS}$ with $V_{COMP}$, in alternative embodiments, the CCVS 502 may be placed on the "negative" side of the comparator 310 so as to sum the voltage $V_{CS}$ with $V_{RAMP}$, thereby generating a modified periodic voltage signal to be compared to $V_{COMP}$ in the comparator 310.

Second Embodiment

Figure 8:
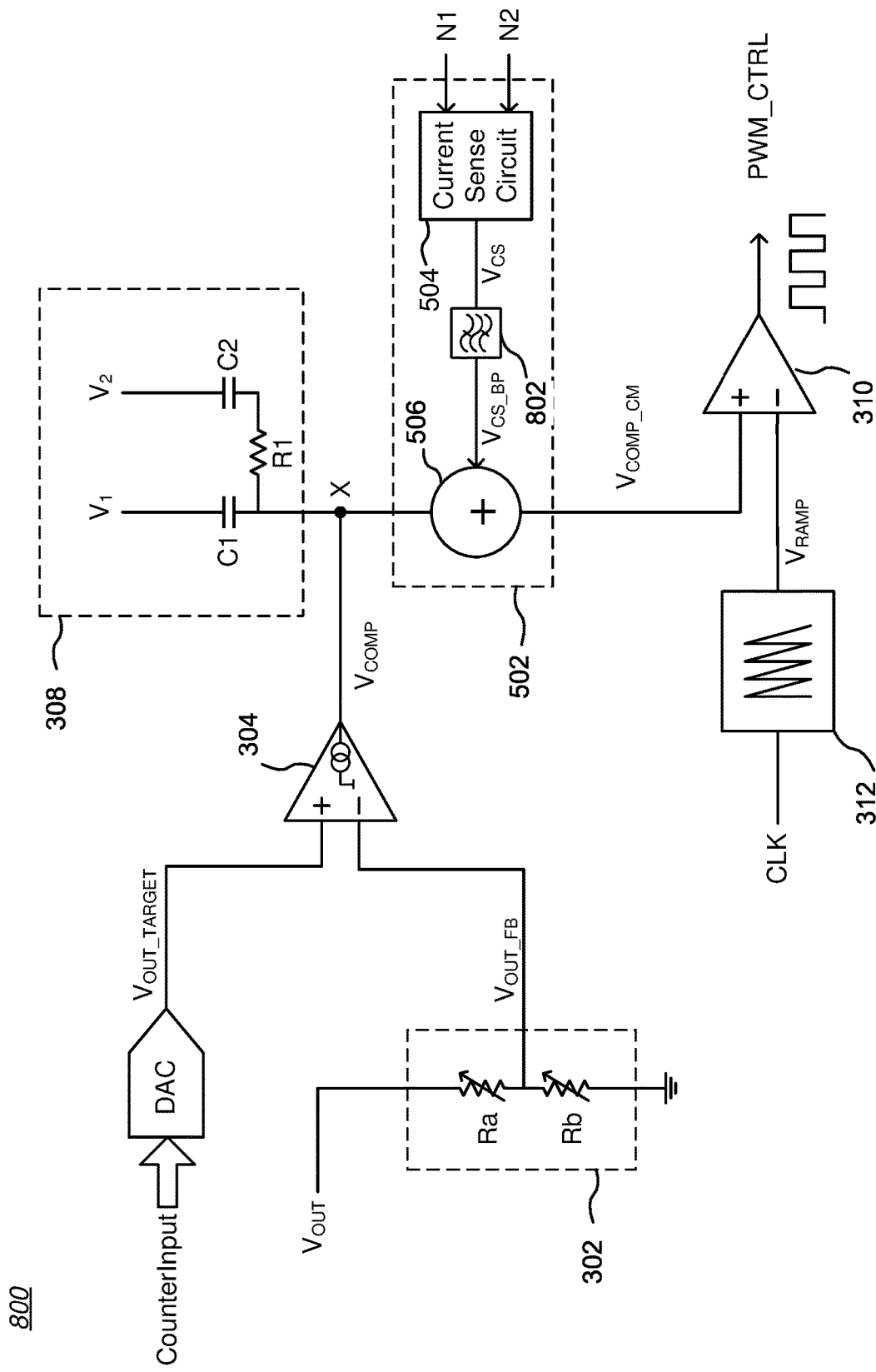
FIG. 8 is a schematic diagram of a second embodiment of an improved PWM duty cycle controller which may be used in the circuit of FIG. 2.

FIG. 8 is a schematic diagram of a second embodiment of an improved PWM duty cycle controller 800 which may be used in the circuit of FIG. 2. In most aspects similar to the improved PWM duty cycle controller 500 of FIG. 5, the embodiment of FIG. 8 introduces a band-pass filter 802 between the current sense circuit 504 and the adder 506. The bandpass filter 802 receives the output voltage $V_{CS}$ (which represents the time-varying current through the inductor L of FIG. 2) from the current sense circuit 504 and outputs a modified voltage $V_{CS\_BP}$ that represents only certain frequencies of the time-varying current through the inductor L of FIG. 2. Stated differently, the voltage $V_{CS\_BP}$ is only generated in significant amounts when the frequency of the time-varying current through the inductor L is within the pass band of the bandpass filter 802, and little or no voltage $V_{CS\_BP}$ is generated when the frequency of the time-varying current through the inductor L is outside the pass band. The bandpass region generally should encompass the resonant frequencies of the tank circuit formed by the inductor L and capacitor C of FIG. 2.

The illustrated embodiment thus allows the current through the inductor L to affect the feedback control of the duty cycle controller 800 only within a selected passband of the frequency spectrum, while having little or no effect to the loop response at frequencies outside of the passband. Selective frequency-based current injection better preserves the benefits of Voltage Mode outside of the bandpass region while enabling the injection of a Current Mode signal within the bandpass region, which makes the system simpler and more robust.

While the example circuit shown in FIG. 8 places the CCVS 502 on the "plus" side of the comparator 310 so as to sum the voltage $V_{CS\_BP}$ with $V_{COMP}$, in alternative embodiments, the CCVS 502 may be placed on the "negative" side of the comparator 310 so as to sum the voltage $V_{CS}$_BP with $V_{RAMP}$, thereby generating a modified periodic voltage signal to be compared to $V_{COMP}$ in the comparator 310.

Alternative Embodiments and Additional Benefits

In alternative embodiments, the voltage $V_{CS}$ that is representative of and proportional to the current flowing through the inductor L may be generated by estimating that current. For example, by combining information such as the values of $V_{IN}$, $V_{OUT}$, L, etc., with a model of either improved PWM duty cycle controller 500, 800, a loop control signal may be generated, in known fashion, that has a similar shape and timing of a direct measurement of the current flowing through the inductor L. Thus, $V_{CS}$ need only be proportional to a current representative of a current output of the power converter, whether measured through the inductor L or estimated or otherwise determined.

In addition to the benefits noted above, an added advantage of embodiments of the present invention is that a DC-to-DC power converter using the improved PWM duty cycle controllers 500, 800 that only has a fractional amount (e.g., 60%) of current mode added in can include safety monitoring protections, such as open-loop detection and clamping of the $V_{RAMP}$ to reasonable values to speed-up open-loop recovery. In embodiments of the present invention, most of the control loop dynamics are predominantly Voltage Mode and thus most of Voltage Mode error detection and recovery circuits and techniques may be used successfully.

While the present disclosure has focused on improved PWM duty cycle controllers 500, 800 for a fixed-frequency DC-to-DC power converter circuit 200, the concepts are applicable to other types of closed-loop DC-to-DC power converter that are controlled by a PWM signal.

Methods

Figure 9:
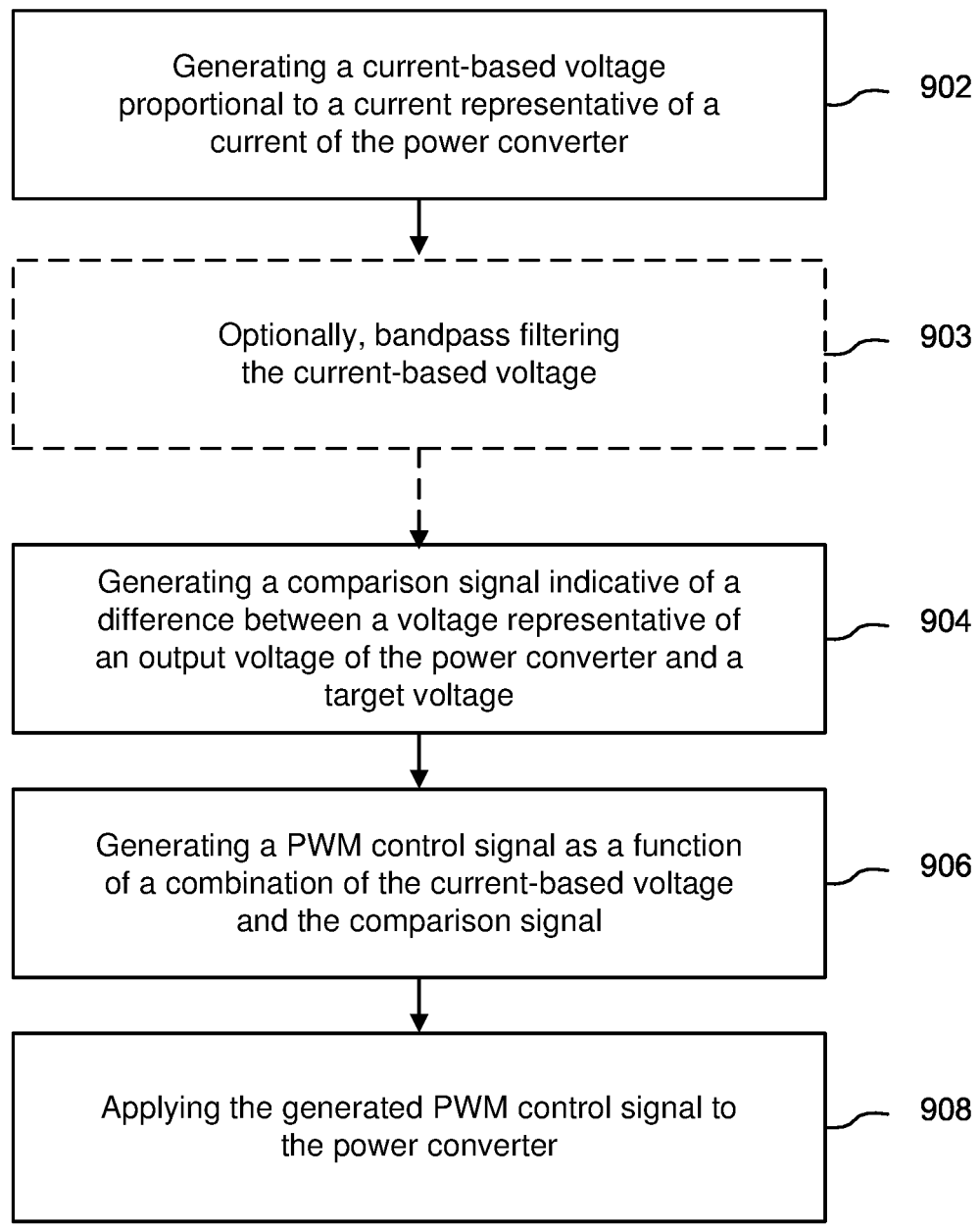
FIG. 9 is a process flow chart showing a first method for controlling a power converter controlled by a PWM control signal.

Another aspect of the invention includes methods for controlling a power converter controlled by a PWM control signal. As one example, FIG. 9 is a process flow chart 900 showing a first method for controlling a power converter controlled by a PWM control signal. The method includes: generating a current-based voltage proportional to a current representative of a current of the power converter (Block 902); optionally, bandpass filtering the current-based voltage (Block 903); generating a comparison signal indicative of a difference between a voltage representative of an output voltage of the power converter and a target voltage (Block 904); generating a PWM control signal as a function of a combination of the current-based voltage and the comparison signal (Block 906); and applying the generated PWM control signal to the power converter (Block 908). A variant method generates the PWM control signal as a function of (a) a combination of the current-based voltage and a periodic waveform and (b) the comparison signal.

Figure 10:
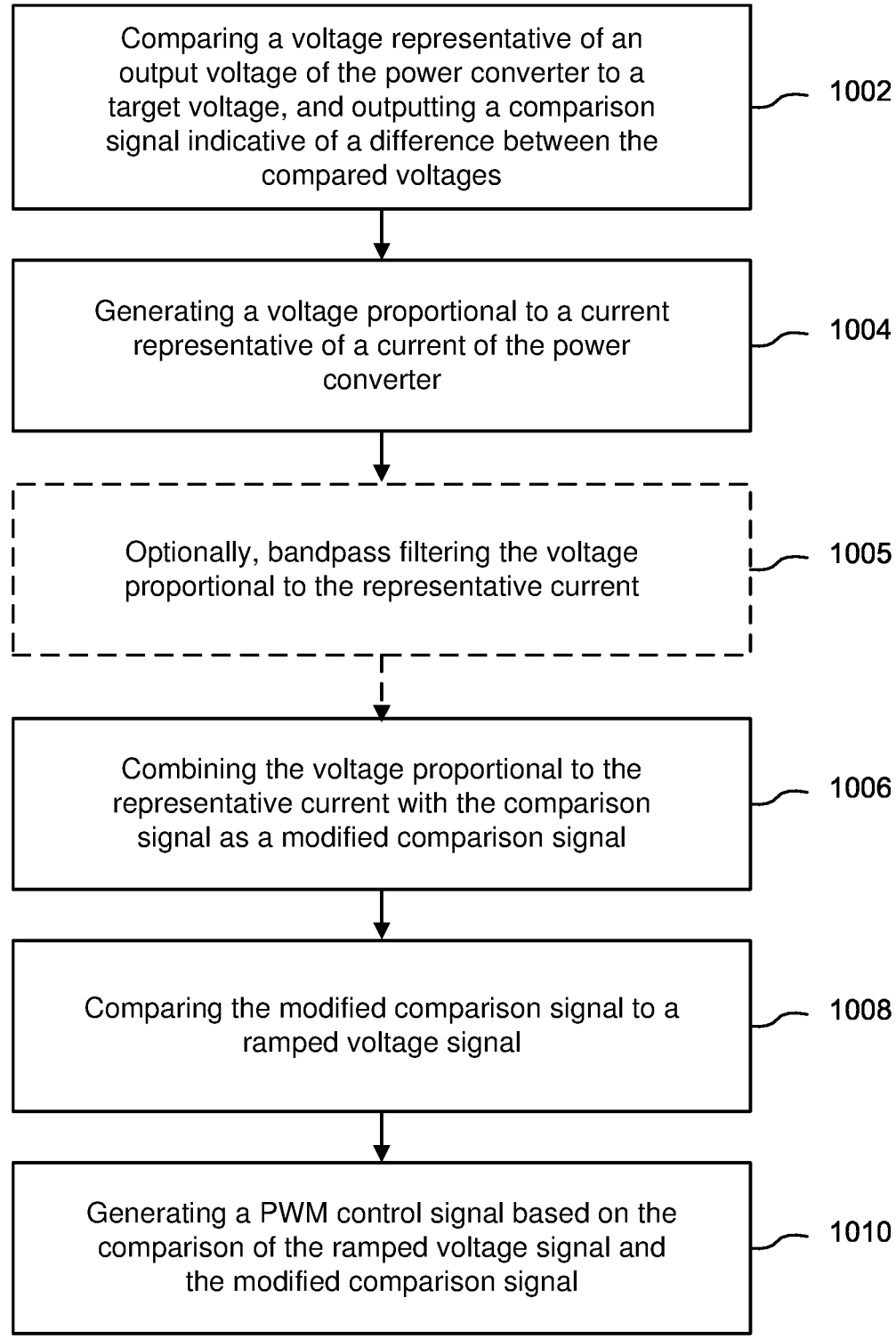
FIG. 10 is a process flow chart showing a second method for controlling a power converter controlled by a PWM control signal.

As another example, FIG. 10 is a process flow chart 1000 showing a second method for controlling a power converter controlled by a PWM control signal. The method includes: comparing a voltage representative of an output voltage of the power converter to a target voltage, and outputting a comparison signal indicative of a difference between the compared voltages (Block 1002); generating a voltage proportional to a current representative of a current of the power converter (Block 1004); optionally, bandpass filtering the voltage proportional to the representative current (Block 1005); combining the voltage proportional to the representative current with the comparison signal as a modified comparison signal (Block 1006); comparing the modified comparison signal to a ramped voltage signal (Block 10010); and generating a PWM control signal based on the comparison of the ramped voltage signal and the modified comparison signal (Block 1010). A variant method generates the PWM control signal as a function of (a) a combination of the voltage proportional to a current representative of a current of the power converter and the ramped voltage signal and (b) the comparison signal.

Additional aspects of the above methods may include one or more of the following: generating a scaled version of the output voltage of the power converter as the voltage representative of the output voltage of the power converter circuit; the power converter being a fixed-frequency DC-to-DC power converter; and/or generating a voltage proportional to a current representative of a current output of the power converter is by means of a current-controlled voltage source.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method for controlling a power converter controlled by a pulse-width modulation (PWM) control signal, the method including:
    (a) generating a current-based voltage proportional to a representative high-frequency filtered current of the power converter, wherein the representative high-frequency filtered current is time-varying and the current-based voltage is only generated in significant amounts when a frequency of the time-varying representative high-frequency filtered current is not filtered out;
    (b) generating a comparison signal indicative of a difference between a voltage representative of an output voltage of the power converter and a target voltage;
    (c) combining, as a modified comparison signal, (1) the comparison signal and (2) the current-based voltage;
    (d) generating a PWM control signal as a function of a combination of a periodic waveform, the current-based voltage, and the comparison signal; and
    (e) applying the generated PWM control signal to the power converter.

2. The method of claim 1, further including generating a scaled version of the output voltage of the power converter as the voltage representative of the output voltage of the power converter circuit.

3. The method of claim 1, wherein the power converter is a fixed-frequency DC-to-DC power converter.

4. The method of claim 1, wherein generating the current-based voltage is by means of a current-controlled voltage source.

5. The method of claim 1, further including bandpass filtering the current-based voltage before generating the PWM control signal.

6. The method of claim 1, wherein the power converter is a fixed-frequency switched inductor-capacitor DC-to-DC power converter.

7. A method for controlling a power converter controlled by a pulse-width modulation (PWM) control signal, the method including:
    (a) comparing a voltage representative of an output voltage of the power converter to a target voltage, and outputting a comparison signal indicative of a difference between the compared voltages;
    (b) generating a proportional voltage proportional to a representative high-frequency filtered current of the power converter, wherein the representative high-frequency filtered current is time-varying and the proportional voltage is only generated in significant amounts when a frequency of the time-varying representative high-frequency filtered current is not filtered out;
    (c) combining the proportional voltage with the comparison signal as a modified comparison signal;
    (d) comparing the modified comparison signal to a periodic voltage signal; and
    (e) generating the PWM control signal based on the comparison of the periodic voltage signal and the modified comparison signal.

8. The method of claim 7, further including generating a scaled version of the output voltage of the power converter as the voltage representative of the output voltage of the power converter circuit.

9. The method of claim 7, wherein the power converter is a fixed-frequency DC-to-DC power converter.

10. The method of claim 7, wherein generating the proportional voltage is by means of a current-controlled voltage source.

11. The method of claim 7, further including bandpass filtering the proportional voltage.

12. The method of claim 7, wherein the power converter is a fixed-frequency switched inductor-capacitor DC-to-DC power converter.

13. A controller for a power converter controlled by a pulse-width modulation (PWM) control signal, the controller including:
    (a) a comparison circuit configured to be coupled to an output voltage of the power converter and to a target voltage, and to output a comparison signal indicative of a difference between the coupled voltages;
    (b) a modifier circuit configured to be coupled to the power converter and including:
        (1) a current-controlled voltage source configured to generate a proportional voltage that is proportional to an output current of the power converter;
        (2) a bandpass filter coupled to the current-controlled voltage source and configured to receive the proportional voltage and to generate a filtered proportional voltage only for certain time-varying frequencies of the output current, wherein the filtered proportional voltage is only generated in significant amounts when the time-varying frequencies of the output current that are not filtered out; and (3) a combining element that combines, as a modified comparison signal, (1) the filtered proportional voltage and (2) the comparison signal from the comparison circuit; and (c) a comparator, coupled to a modifier circuit and to a periodic voltage signal, for generating the PWM control signal as a function of the periodic voltage signal and the modified comparison signal.

14. The invention of claim 13, further including a scaling circuit coupled to the comparison circuit and configured to be coupled to the output voltage of the power converter, the scaling circuit configured to provide a scaled version of the output voltage to the comparison circuit.

15. The invention of claim 13, further including a compensation circuit coupled to the output of the comparison circuit and configured to stabilize a closed-loop response of the controller.

16. The invention of claim 13, wherein the modifier circuit includes an adjustable gain.

17. The invention of claim 13, wherein the power converter is a fixed-frequency switched inductor-capacitor DC-to-DC power converter.

18. The invention of claim 13, wherein the power converter is a DC-to-DC power converter configured to generate an output voltage from an input voltage, the output voltage having a value different from the input voltage.

* * * * *